United States Statutory Invention Registration [19]

[11] Reg. Number: H829

Behl [43] Published: Oct. 2, 1990

[54] RECHARGEABLE LITHIUM-ORGANIC ELECTROLYTE BATTERY HAVING OVERCHARGE PROTECTION AND METHOD OF PROVIDING OVERCHARGE PROTECTION FOR A LITHIUM-ORGANIC ELECTROLYTE BATTERY

[75] Inventor: Wishvender K. Behl, Ocean, N.J.

[73] Assignee: The United States of America as represented by the Secretary of the Army, Washington, D.C.

[21] Appl. No.: 744,344

[22] Filed: Jun. 13, 1985

[51] Int. Cl.[5] ..... H01M 6/14

[52] U.S. Cl. ..... 429/194; 429/218

[58] Field of Search ..... 429/199, 194, 197

[56] References Cited

U.S. PATENT DOCUMENTS

| | | | |
|---|---|---|---|
| 4,163,829 | 8/1979 | Kronenberg | 429/194 |
| 4,184,017 | 1/1980 | Kelsey et al. | 429/197 |
| 4,228,227 | 10/1980 | Saathoff | 429/199 X |
| 4,279,972 | 7/1981 | Moses | 429/194 X |
| 4,450,214 | 5/1984 | Davis | 429/199 X |

*Primary Examiner*—John F. Terapane
*Assistant Examiner*—Susan Wolffe
*Attorney, Agent, or Firm*—Sheldon Kanars; Jeremiah G. Murray; Roy E. Gordon

[57] ABSTRACT

Overcharge protection is provided for a rechargeable lithium-organic electrolyte battery by including lithium bromide in the electrolyte.

3 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

RECHARGEABLE LITHIUM-ORGANIC ELECTROLYTE BATTERY HAVING OVERCHARGE PROTECTION AND METHOD OF PROVIDING OVERCHARGE PROTECTION FOR A LITHIUM-ORGANIC ELECTROLYTE BATTERY

The invention described herein may be manufactured, used, and licensed by or for the Government for governmental purposes without the payment to me of any royalty thereon.

This invention relates in general to improving rechargeable lithium-organic electrolyte batteries and in particular, to providing rechargeable lithium-organic electrolyte batteries with overcharge protection.

BACKGROUND OF THE INVENTION

Rechargeable lithium-organic electrolyte batteries are now being developed to provide low cost, high energy density power sources for communications, night vision and other applications. Typically, a rechargeable lithium-organic electrolyte battery is comprised of a lithium anode, a cathode including compounds such as titanium disulfide ($TiS_2$), molybdenum oxide ($MoO_3$), chromium oxide ($Cr_2O_3$), vanadium oxides ($V_2O_5$ and $V_6O_{13}$), vanadium sulfide ($V_2S_5$) etc. and an electrolyte solution including a lithium salt such as lithium perchlorate, lithium hexafluoroarsenate, lithium tetrachloroaluminate etc in an organic solvent such as propylene carbonate, dioxolane, diethyl ether, sulfolane, tetrahydrofuran, 2-methyl tetrahydrofuran, etc.

One of the problems common to rechargeable lithium-organic electrolyte batteries is the oxidation of the organic solvent during the overcharging of these cells resulting in the degradation of electrolyte solutions.

There are two ways of dealing with the "overcharging problem". One approach is to monitor and regulate the voltage of each individual cell in the battery. That approach is deemed relatively complex and costly. The second approach is to introduce an electrochemical couple capable of accepting and dispersing excess charging energy delivered to a cell. In this connection, promising results have been obtained using the lithium iodide/iodine couple. That is, during overcharging of lithium-organic electrolyte cells, lithium iodide is oxidized at about 2.79V to iodine and thereby prevents the oxidation of the organic solvent that occurs at potentials above about 4 volts. Iodine formed in the above reaction chemically reacts with lithium metal to regenerate lithium iodide in solution. Thus, the lithium iodide/iodine shuttle mechanism provides overcharge protection in rechargeable lithium-organic electrolyte cells.

The difficulty is that the oxidation of lithium iodide in organic electrolyte solutions occurs at potentials of about 2.8V which is close to the charging potentials of most of the cathodic materials and this interferes with the charging process.

SUMMARY OF THE INVENTION

The general object of this invention is to provide overcharge protection for rechargeable lithium-organic electrolyte batteries. A further object is to prevent the undesireable oxidation of organic solvents during the overcharge of the rechargeable lithium-organic electrolyte batteries.

It has now been found that the aforementioned objects can be attained by including lithium bromide in the electrolyte to provide overcharge protection during the overcharging of rechargeable lithium-organic electrolyte cells. More particularly, it has been found that during overcharging, lithium bromide will be oxidized at lower potentials than the organic solvent and thereby provide overcharge protection and prevent the undesireable oxidation of organic solvents.

DESCRIPTION OF THE PREFERRED EMBODIMENT

In order to simulate the conditions of overcharge, a linearly increasing voltage sweep is applied to a carbon electrode in 1.5 molar lithium hexafluoroarsenate-tetrahydrofuran electrolyte solution containing 0.043 molar lithium bromide. Lithium bromide is found to be oxidized first at potentials positive to about 3.5 volts versus a lithium reference. The oxidation of lithium bromide occurs much below the oxidation potential of 4.5 volts where the tetrahydrofuran is oxidized. Thus, during overcharging of lithium-organic electrolyte cells, lithium bromide is preferentially oxidized at about 3.5 volts to form lithium tribromide and bromine respectively and thereby prevent the oxidation of the organic solvent. The bromine formed combines with lithium bromide in solution to form lithium tribromide. The lithium bromide additive is regenerated by the chemical reaction of lithium metal with bromine or lithium tribromide and also by the electrochemical reduction of lithium tribromide at potentials below about 3.5 volts during the following discharge cycle and thus is ready to provide overcharge protection once again during subsequent charge cycles.

According to the invention, the amount of lithium bromide included is limited by the solubility of lithium bromide in the particular organic solvent used. The lithium bromide is added when the electrolyte is prepared.

I wish it to be understood that I do not desire to be limited to the exact details as described for obvious modifications will occur to a person skilled in the art.

What is claimed is:

1. A method of providing overcharge protection for a rechargeable lithium-organic electrolyte battery including lithium as the anode, a member of the group consisting of $TiS_2$, $MoO_3$, $Cr_2O_3$, $V_2O_5$, $V_6O_{13}$, and $V_2S_5$ as the cathode, and a solution of a lithium salt selected from the group consisting of lithium perchlorate, lithium hexafluoroarsenate, and lithium tetrachloroaluminate in an organic solvent as the electrolyte, said method comprising including lithium bromide in the electrolyte to prevent the undesirable oxidation of organic solvent during the overcharge of the rechargeable lithium-organic electrolyte battery.

2. Method according to claim 1 wherein the amount of lithium bromide included is limited by the solubility of lithium bromide in the particular organic solvent used.

3. A method of providing overcharge protection for a lithium-organic electrolyte battery including lithium as the anode, $TiS_2$ as the cathode, and 1.5 molar $LiAsF_6$ in tetrahydrofuran as the electrolyte, said method comprising including about 0.043 molar lithium bromide in the electrolyte to prevent the undesirable oxidation of organic solvent during the overcharge of the rechargeable lithium-organic electrolyte battery.

* * * * *